(12) United States Patent
Rudner et al.

(10) Patent No.: US 12,102,066 B1
(45) Date of Patent: Oct. 1, 2024

(54) AQUACULTURE BIOFOULING MANAGEMENT USING AXLE-GUIDED CAGE FLIPPING

(71) Applicant: Lawrence Michael Rudner, Saint Michaels, MD (US)

(72) Inventors: Lawrence Michael Rudner, Saint Michaels, MD (US); Willem M Roosenburg, Athens, OH (US)

( * ) Notice: Subject to any disclaimer, the term of this patent is extended or adjusted under 35 U.S.C. 154(b) by 0 days.

(21) Appl. No.: 18/629,094

(22) Filed: Apr. 8, 2024

(51) Int. Cl.
*A01K 61/60* (2017.01)

(52) U.S. Cl.
CPC .................................. *A01K 61/60* (2017.01)

(58) Field of Classification Search
CPC ...... A01K 63/10; A01K 61/65; B65G 47/248; B65G 9/008; B65G 21/20; B65G 21/22
See application file for complete search history.

(56) References Cited

U.S. PATENT DOCUMENTS

| | | | | |
|---|---|---|---|---|
| 2,920,581 A * | 1/1960 | Cook | ...................... | B65G 9/002 |
| | | | | 104/107 |
| 3,909,971 A * | 10/1975 | Wilde | ...................... | A01K 61/54 |
| | | | | 119/237 |
| 4,896,626 A * | 1/1990 | Holt | ...................... | A01K 61/54 |
| | | | | 119/237 |
| 2005/0284729 A1* | 12/2005 | LoRusso | ................ | B65G 9/008 |
| | | | | 198/301 |
| 2010/0034631 A1* | 2/2010 | Klaiber | .................. | B65G 9/002 |
| | | | | 414/800 |
| 2020/0396968 A1* | 12/2020 | Docker | ................... | A01K 61/55 |
| 2021/0000084 A1* | 1/2021 | Sampson | ............... | A01K 61/50 |
| 2023/0225299 A1* | 7/2023 | Thompson | ............. | A01K 61/55 |
| | | | | 119/200 |

FOREIGN PATENT DOCUMENTS

| | | | | |
|---|---|---|---|---|
| WO | WO-2018201191 A1 | * | 11/2018 | ............. A01K 61/54 |
| WO | WO-2019151879 A1 | * | 8/2019 | ............. A01K 61/54 |

OTHER PUBLICATIONS

Rural Delivery, Flip Farm, May 27, 2022, Youtube https://www.youtube.com/watch?v=BawuqnQjqzU (Year: 2022).*
FlipFarm Systems, Setting up to fill a FlipFarm line, Feb. 16, 2021 https://www.youtube.com/watch?v=myPqw6HleJI (Year: 2021).*
FlipFarm Systems, FlipFarm Heli-cat, Aug. 20, 2021 https://www.youtube.com/watch?v=J2EqAA24AX4 (Year: 2021).*
FlipFarm Systems, FlipFarm oyster system—meet Felix our helix flipper!, Feb. 25, 2019 https://www.youtube.com/watch?v=ZX54JdEccXc (Year: 2019).*

* cited by examiner

*Primary Examiner* — Tien Q Dinh
*Assistant Examiner* — Katelyn T Truong

(57) ABSTRACT

This invention describes an aquaculture cage guidance system that simplifies the process of flipping and moving aquaculture cages. The system utilizes specialized cages with hollow axles that allow a longline to pass through them, enabling the cages to pivot. Parallel guide rails positioned close to the axles restrict lateral movement and ensure the cages remain centered as they move along the system. The support structure for the guide rails can be angled or horizontal, allowing the cages to be raised, lowered, or moved horizontally to facilitate operations such as flipping, filling, emptying, and harvesting.

8 Claims, 4 Drawing Sheets

AQUACULTURE BIOFOULING MANAGEMENT USING AXLE-GUIDED CAGE FLIPPING

BACKGROUND OF THE INVENTION

Aquaculture, particularly shellfish farming, is an important industry. The cultivation of shellfish, such as oysters, often involves the use of floating cages or baskets tethered to the surface using longlines to provide a controlled environment for growth, protect the shellfish from predators, and enable efficient harvesting.

A key challenge in shellfish aquaculture with floating cages is the accumulation of biofouling organisms, including algae, barnacles, cushion moss, and mussels, on the submerged surfaces of the oysters and their encasing cages. This biofouling can negatively impact the health and growth of the shellfish.

Various techniques have been employed to address biofouling, primarily involving manual labor to physically flip the cages and facilitate desiccation of the fouling organisms. With hundreds or thousands of cages on a typical aquaculture farm, this manual flipping process is extremely labor-intensive.

Some mechanized systems have been developed to automate the cage flipping process, such as the FlipFarm® Felix flipper. However, these mechanized solutions tend to be large, complex, and costly, limiting their accessibility and adoption by many oyster farmers. Additionally, these existing mechanized systems rely on the use of elevated side rails to guide the cages during flipping.

There remains a need in the shellfish aquaculture industry for a more efficient and cost-effective approach to managing biofouling that can integrate seamlessly with existing farming operations.

SUMMARY OF THE INVENTION

The objective of the invention is to reduce the labor-intensive aspects of shellfish farming. It does this by providing a semi-automated cage flipping system with parallel guides close to cage mounted axles. This system allows for the efficient flipping of cages between growing and drying positions, as well as the filling and emptying of cages, without the need for additional structures or large floating platforms.

The system consists of a longline of aquaculture cages and a flipping ramp. Specially designed cages are strung together on the longline. The flipping ramp can be attached to the side of any workboat of any size not requiring a separate platform or propulsion. As the cages ascend the ramp with the axles and long line under the cages and the workboat moving parallel to the long line, the axles remain between the guides, ensuring the cages stay centered and stable. Once the cages reach the top, gravity flips the cages from the growing to the drying position. The system can also be used on a ramp to fill or empty the cages.

BRIEF DESCRIPTION OF DRAWINGS

The figures and description use specific embodiments and are not intended to illustrate all applications of the inventions.

DETAILED DESCRIPTION OF THE INVENTION

The cage guidance system is comprised of three key components: a stationary longline; specialized cages with hollow axles containing the longline; and parallel guide rails mounted on a separate structure. Two of the guide rails are positioned parallel to the axle and spaced only slightly wider than the axle diameter, between 1.01 and 2 times the axle width. As the cages traverse the structure, the close spacing between the guide rails ensures that the axles remain centered between the guide rails and effectively restricts lateral movement.

Figure 1:
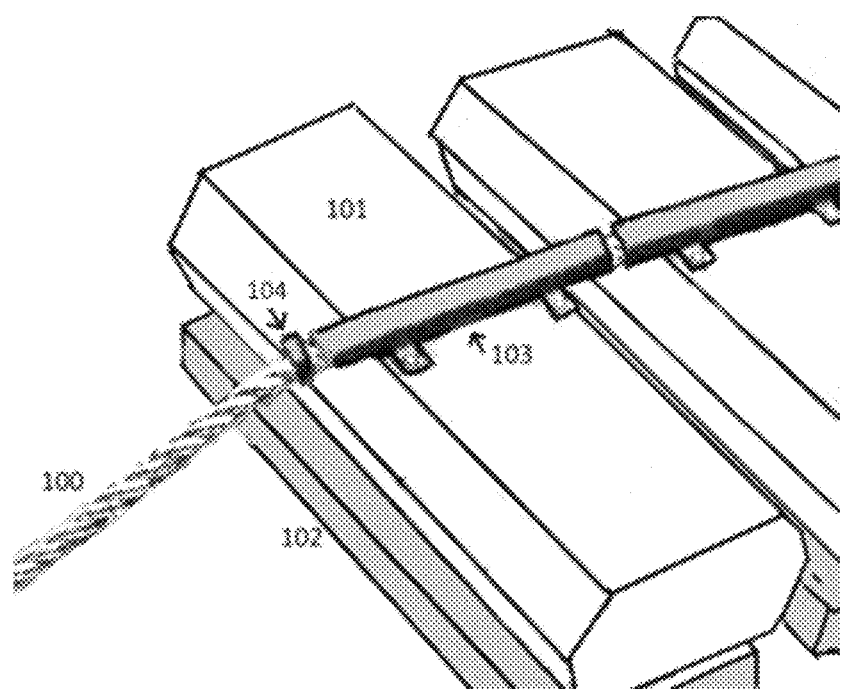
FIG. 1 shows an example of specialized cages.

Each cage is constructed using a basket (101), such as a standard Vexar® bag or Hexcyl® hard plastic basket, with a float (102) on one side and an axle (103) secured across the short dimension and bisecting the long dimension, as detailed in U.S. Pat. No. 11,083,175. A longline (100) threads through each axle, and oysters are placed inside the basket. Stoppers (104) connected to the longline prevent cage movement along the longline. In one embodiment, the longline terminates with a float, chain, and Danforth anchor at each end. This setup allows the cages to be positioned to remain in either in the drying position, with the float on the bottom and the basket on top for desiccation (FIG. 1), or to be flipped to the growing position, with the float on top and the basket of oysters submerged in the water below.

Figure 2:
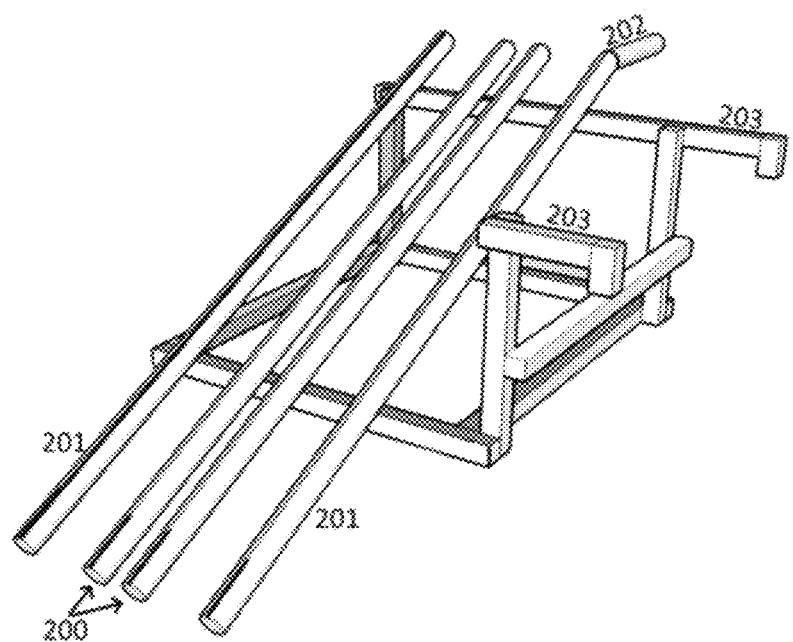
FIG. 2 is an example of an upwardly sloping ramp with the parallel guides used for flipping the specialized cages from the growing position with the axels under the cages to the drying position.

The innovative aspect resides in employing two guides positioned parallel and adjacent to the axles, with their spacing just 1.01 to 2 times the diameter of the axle. This narrow precise spacing ensures that the alignment of the cages is maintained. FIG. 2 depicts an embodiment designed for use with cages in the growing position and axles on the bottom. The guides (200) are affixed to an upwardly sloping ramp, one with a positive angle relative to the horizon and the water, attached to the starboard side of a workboat via arms (203) clamped to the boat's gunnel. The two outer guides (201) control the horizontal position of the cages.

Figure 3:
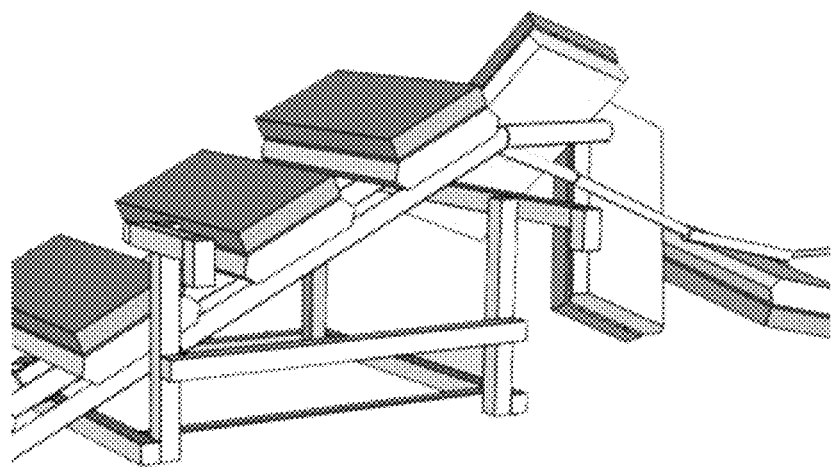
FIG. 3 is an example of an upwardly sloping ramp with specialized cages.

As the cages ascend the ramp, moving left to right alongside the workboat, the axles (103) remain between the center guides (200) ensuring the cages remain centered over the guidance support structure. The cages straddle the outer guides (201) which just provide support. When a cage reaches the top of the ramp, gravity facilitates its flip to the drying position. An optional ramp extension (202) assists in the flipping process as illustrated in FIG. 3. In this example, the ramp is mounted to the side of the workboat. Another embodiment is the use of a self-propelled ramp.

Figure 4:
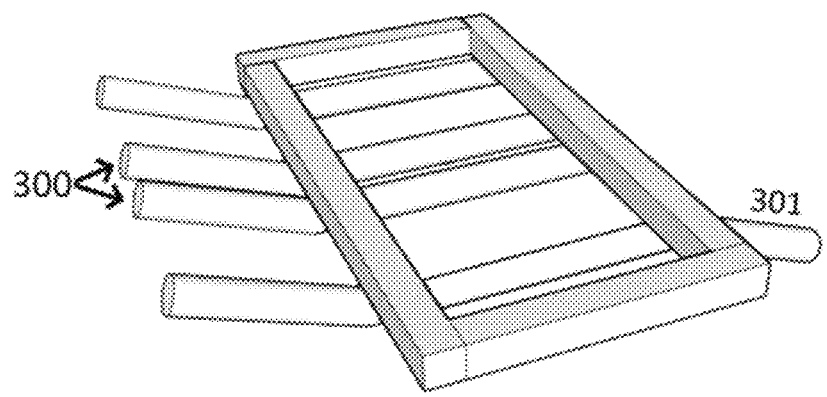
FIG. 4 is an example of a downwardly sloping ramp with parallel guides used for flipping the specialized cages from the drying position with the axles on top of the cages to the growing position.
Figure 5:
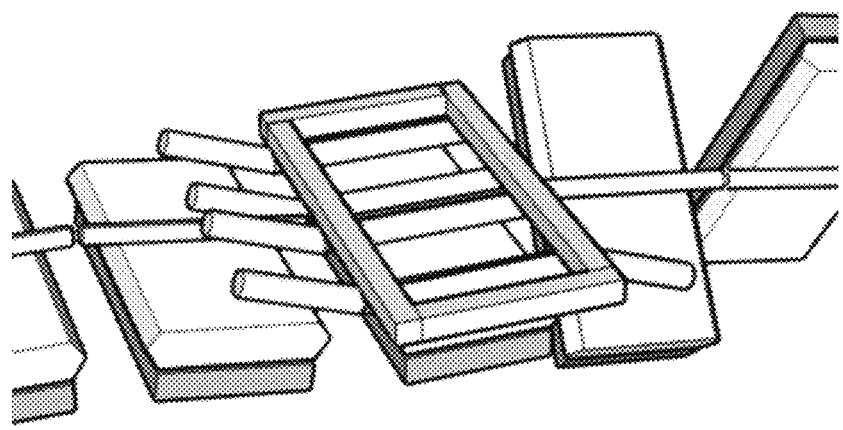
FIG. 5 is an example demonstrating the reverse flipping function with the specialized cages.

FIG. 4 illustrates an embodiment for flipping the longline of cages from the drying position, with the axle on top, to the growing position with the oysters submerged using a downwardly sloping ramp, i.e. a ramp with a negative slop relative to the horizon. As the cages descend the ramp, parallel rails (300) close to the axle maintain their horizontal position, guiding them and pushing them underwater. At the ramp's end, buoyancy provided by the cage float flips the exiting cage to the drying position. An optional ramp extension (301) assists in this process, as shown in FIG. 5.

Figure 6:
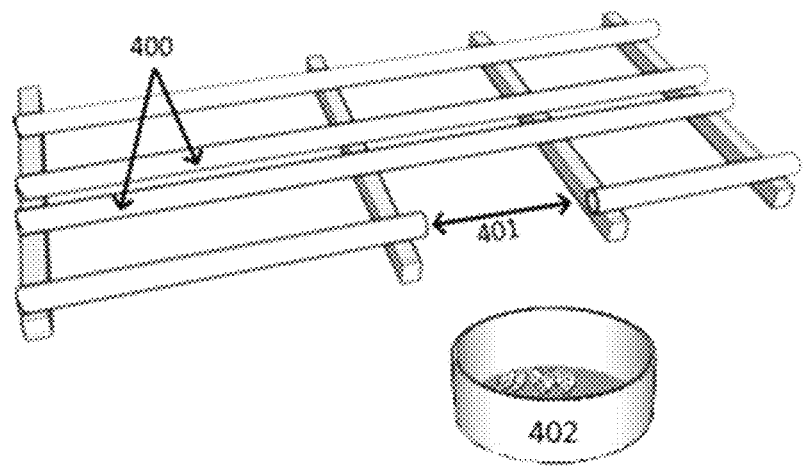
FIG. 6 is an example of a horizontal ramp with the parallel guides used for emptying and filling specialized cages.
Figure 7:
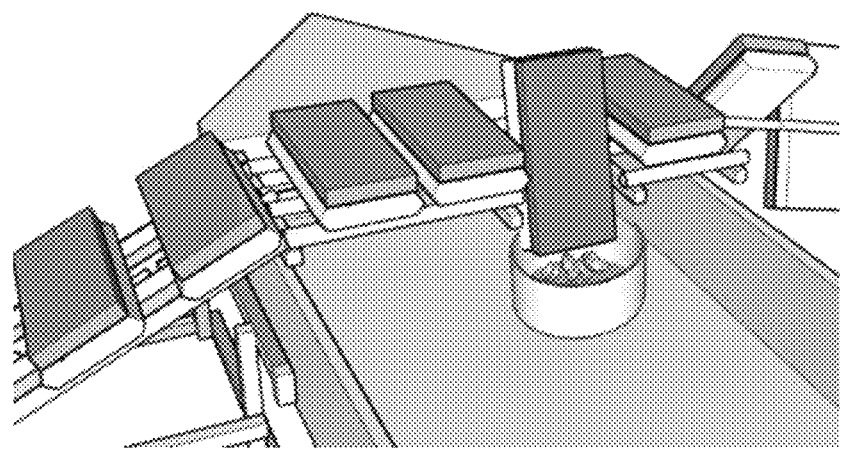
FIG. 7 is an example showing specialized cages traversing horizontally across a boat for harvesting.

FIG. 6 depicts an embodiment for filling and emptying baskets in a longline of cages starting in the growing position. A ramp, like the one in FIG. 1, guides cages onto a boat or barge. Horizontal, parallel guides (400) close to the axle facilitate cage movement across the boat. An opening on one side (401) allows for basket position changes, aiding in emptying or filling them into a container placed on the boat floor (402). One embodiment employs a pull line, pulleys, and a motor to pull the longline of cages up the ramp and onto the boat. This allows all harvesting to occur entirely inside the boat and without additional labor.

PRIOR ART

This guidance system differs from existing methods in several significant ways:

Design: Existing systems typically utilize elevated outer rails along a ramp platform for basket guidance, often leading to binding issues exacerbated by long-line slack. In contrast, this invention utilizes the cage axles and parallel rails for precise positioning between the guide rails, reducing binding occurrences and simplifying construction.

Size and Portability: This ramp system is notably lighter and more compact than current technology, enhancing portability. Its placement within the workboat simplifies transportation to and from the oyster farm, and it can be deployed and retrieved by a single person.

US Patent Application Publication 20210000084 to Sampson discloses an aquatic cage rotation device that uses a guide path, specifically a large cylindrical structure, to facilitate the flipping of aquaculture cages. While Sampson's device does provide guidance for the cages, it relies on the sides of the cylindrical structure and the sides of the cages themselves, rather than utilizing dedicated guide rails along the cage axles as in the present invention.

Additionally, a system known as "Flip Farm" demonstrated in a May 2022 episode of the "Rural Delivery" YouTube series also uses a mechanized system to flip aquaculture cages. However, the Flip Farm system employs side rails for guidance, with the cage axles serving only a supportive function rather than being integrated into the guidance mechanism.

Tram carrier systems described in U.S. Pat. No. 2,920,581 and US Patent Application Publications 20050284729 and 20050284729 utilize guide rails that partially enclose and lock into the axles of industrial transport vehicles. However, in these tram carrier systems, the axles are separate components that the transport vehicles attach and detach from, unlike the present aquaculture cage guidance system where the axles are integrated directly into the cage structures.

One key difference is that the tram carrier systems rely on the axles being separate, detachable components, whereas the aquaculture cage guidance system integrates the axles directly into the cage design. This allows the aquaculture cages to pivot and flip in a way that would not be possible with the detachable axle approach of the tram carriers.

Additionally, the tram carrier systems are designed for industrial transportation applications, rather than the specific requirements of aquaculture cage handling. In contrast, the parallel guide rail configuration and cage-integrated axles of the present invention differ in their approach to addressing the challenges faced in shellfish farming operations.

The invention claimed is:

1. An aquaculture cage guidance system comprised of:
   a. floating aquaculture cages, each of the floating aquaculture cages comprising:
      a basket,
      one hollow axle affixed to an exterior surface of the basket, the one hollow axle spanning a short side and bisecting a long side of each of the floating aquaculture cages,
      a float secured to a second exterior surface of the basket opposite the one hollow axle;
   b. a stationary longline passing through each of the hollow axles of the floating aquaculture cages, the stationary longline and each of the hollow axles of the floating aquaculture cages to allow the floating aquaculture cages to pivot about the stationary longline;
   c. a separate support structure comprising:
      a frame;
      two outer guide rails configured to support each of the floating aquaculture cages mounted to the frame;
      two axle guide rails mounted to the frame between the two outer guide rails and parallel to the two outer guide rails;
         the two axle guide rails positioned parallel to the stationary longline and each of the hollow axles, the distance between the two axle guide rails being between 1.01 and 2 times the width of the hollow axles,
         the two axle guide rails alone configured to restrict lateral movement of the floating aquaculture cages by confining each of the hollow axles and ensuring each of the hollow axles remain centered between the two axle guide rails and that the floating aquaculture cages automatically remain centered with respect to the two outer guide rails and the two axle guide rails, and
      at least one extension portion extending from at least one of the two outer guide rails, the extension portion positioned at an angle with respect to a horizontal plane that is different than an angle of the two outer guide rails and the two axle guide rails with respect to the horizontal plane, the at least one extension portion configured to assist in flipping each of the floating aquaculture cages about the stationary longline passing through each of the hollow axles.

2. The aquaculture cage guidance system of claim 1, wherein the separate support structure is positioned such that the two outer guide rails and the two axle guide rails are at a positive angle relative to the horizontal plane, and each of the hollow axles are on the bottom of the floating aquaculture cages and are situated between the two axle guide rails, thereby facilitating raising of the floating aquaculture cages from an initially lower elevation to a higher elevation.

3. The aquaculture cage guidance system of claim 1, wherein the separate support structure is positioned such that the two outer guide rails and the two axle guide rails are at a negative angle relative to the horizontal plane, and each of the hollow axles are on the top of the floating aquaculture cages and are situated between the two axle guide rails, thereby facilitating lowering of the floating aquaculture cages from an initially higher elevation to a lower elevation.

4. The aquaculture cage guidance system of claim 1, wherein the separate support structure is positioned such that the two outer guide rails and the two axle guide rails are mounted horizontally with respect to the horizontal plane, thereby enabling the movement of the floating aquaculture cages along a horizontal path to facilitate harvesting, cage filling, and cage maintenance.

5. The aquaculture cage guidance system of claim 1, wherein the separate support structure is mounted on a floating platform.

6. The aquaculture cage guidance system of claim 5, wherein the separate support structure is built into an independent floating structure configured for movement via a propulsion mechanism.

7. The aquaculture cage guidance system of claim 2, wherein, upon reaching the higher elevation, the floating aquaculture cages are configured to pivot about the stationary longline to position each of the hollow axles on the top of the cages.

8. The aquaculture cage guidance system of claim 3, wherein, upon reaching the lower elevation, the floating aquaculture cages are configured to pivot about the stationary longline to position each of the hollow axles on the bottom of the cages.

* * * * *